(No Model.) 2 Sheets—Sheet 1.

H. T. DONALDSON.
MARKER FOR CORN PLANTERS.

No. 605,702. Patented June 14, 1898.

Attest
A. J. McCauley
M. F. Smith

Inventor:—
H. T. Donaldson,
By Higdon & Longan
Att'ys.

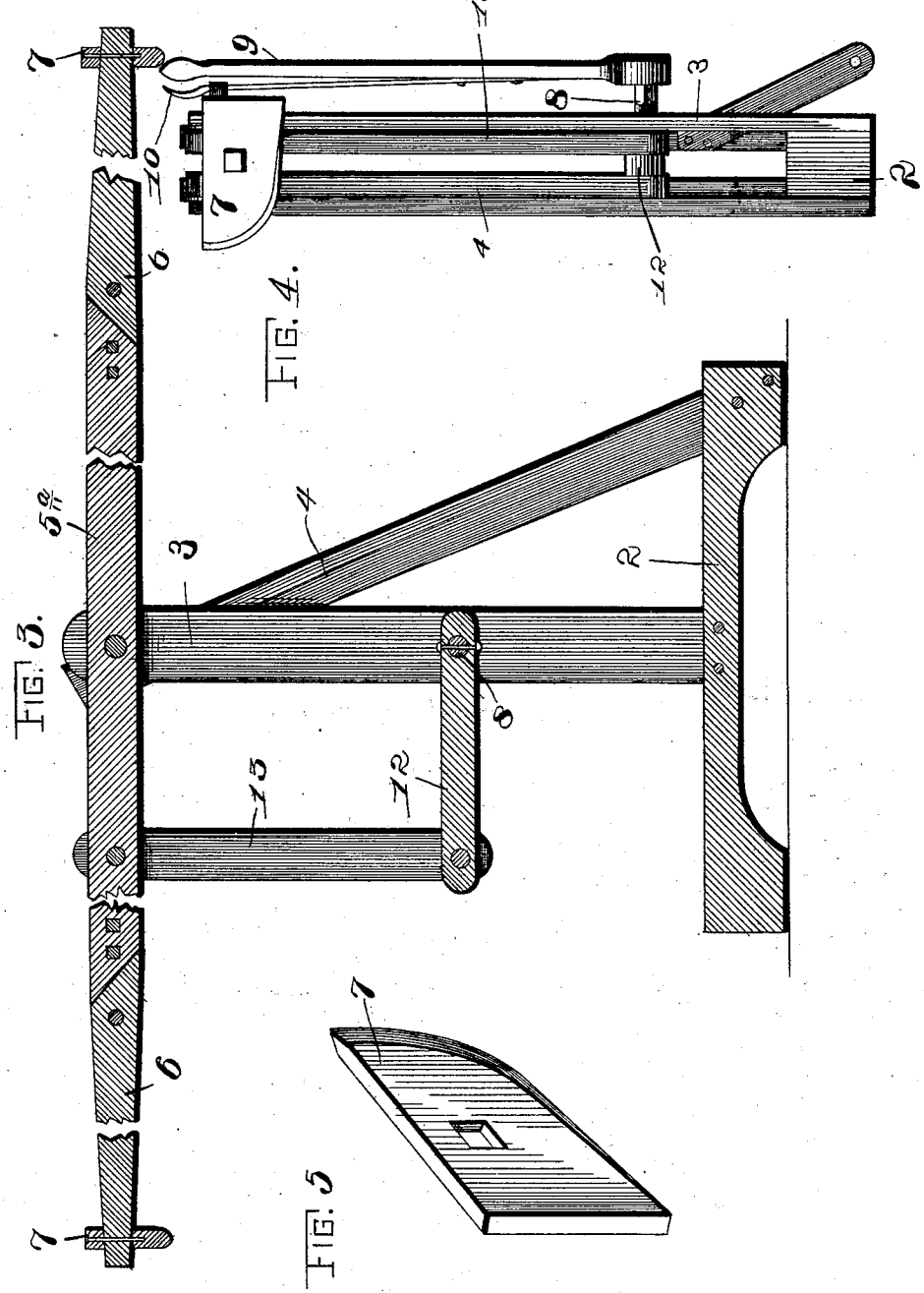

UNITED STATES PATENT OFFICE.

HENRY T. DONALDSON, OF FILLMORE, ILLINOIS.

MARKER FOR CORN-PLANTERS.

SPECIFICATION forming part of Letters Patent No. 605,702, dated June 14, 1898.

Application filed April 5, 1898. Serial No. 676,598. (No model.)

*To all whom it may concern:*

Be it known that I, HENRY T. DONALDSON, of the city of Fillmore, Montgomery county, State of Illinois, have invented certain new and useful Improvements in Markers for Corn-Planters, of which the following is a full, clear, and exact description, reference being had to the accompanying drawings, forming a part hereof.

My invention relates to markers for corn-planters; and it consists in the novel construction, combination, and arrangement of parts, hereinafter shown, described, and claimed.

Figure 1:
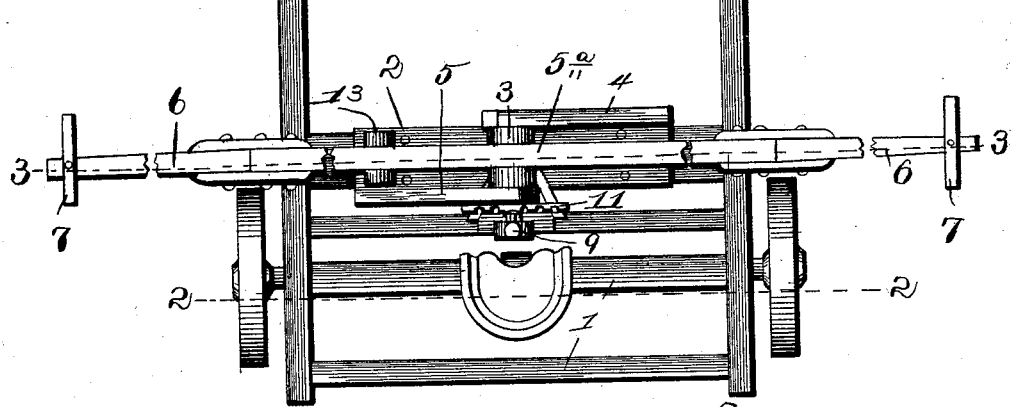
Figure 2:
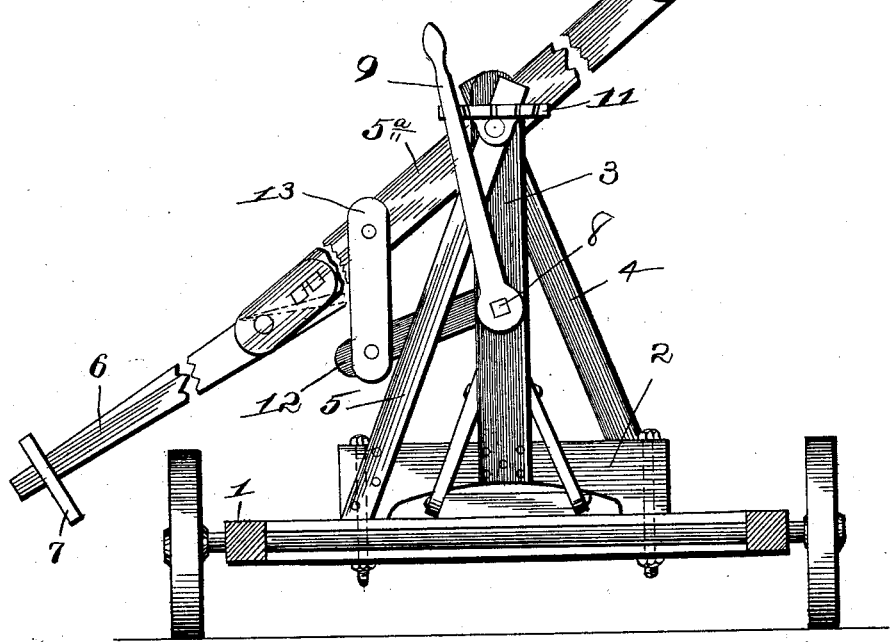

Figure 1 is a plan view of the rear portion of a corn-planter, my improved marker being positioned thereon. Fig. 2 is a transverse sectional view taken approximately on the line 2 2 of Fig. 1. Fig. 3 is an enlarged cross-sectional view taken approximately on the line 3 3 of Fig. 1. Fig. 4 is a side elevation of the marking attachment with the marker-arms in an elevated position. Fig. 5 is a view in perspective of one of the runners made use of in my improved marker.

Referring by numerals to the accompanying drawings, 1 indicates the frame of a planter, the same being mounted upon the usual traction-wheels, and bolted to a transverse timber in the frame immediately in front of the driver's seat is a suitable base 2, to which is fixed a standard 3, the upper end of which is bifurcated, and said standard is braced by the timbers 4 and 5, the bases of which are fixed to the planter-frame. Fulcrumed in the bifurcated upper end of the standard 3 is a beam $5^a$, that extends beyond each side of the frame of the planter, and to each end of said beam 5 is hinged an arm 6, that carries a runner 7. These arms 6 are so hinged to the ends of the beam $5^a$ that they can swing only in an upward direction.

Extending through the standard 3 is a rock-shaft 8, the forward end of which is squared and provided with the hand-lever 9, which hand-lever is constructed with a spring-latch 10, that engages between the teeth of a notched bar 11, carried by the upper portion of the standard 3. To the forward end of the rock-shaft 8 is secured one end of a connecting-bar 12, the outer end of which is pivoted to a bar 13, the opposite end being pivoted to the beam $5^a$. The marking attachment so constructed is located upon the corn-planter, and when said planter is being transported from one place to another the hand-lever 9 is so manipulated as to cause the beam $5^a$ to swing into a horizontal position, as is shown in Fig. 3, and, if desired, the arms 6 may be folded over onto the ends of the beam, and when in this position said arms and beam will not contact with weeds or shrubs during the travel of the planter.

When it is desired to use the marker, the operator swings the arms 6 to their downward limit of movement, which is in alinement with the beam $5^a$, and then by properly manipulating the hand-lever 9 said beam and the arms are swung into an oblique position until one of the runners 7 engages upon the ground over which the planter is moving and at the point it is desired to make the mark. As said planter moves forward the runners 7 will pass over the ground at the proper distance from said planter, and a continuous furrow or mark will thus be made in the ground, which mark may be accurately followed when the planter is moved in the opposite direction across the field.

By providing an arm 6 on each side of the planter a mark can be made on either side of the planter by merely manipulating the hand-lever 9 and tilting the beam $5^a$, which is much easier and more quickly accomplished than where means are used that must be carried from one side of the planter to the other. By hinging the arms 6, so that they will swing only in an upward direction, the runners 7 will readily ride over a stone or root should such an obstruction be encountered by said runners in their travel.

A marking attachment of my improved construction may be applied to any of the planters now in use, is light in weight, simple and cheap in construction, and is very efficient in use.

I claim—

1. A marker for corn-planters, constructed with a standard, a beam fulcrumed in the upper end of said standard, marking-runners carried by the ends of said beam, and means for tilting said beam and holding the same in its tilted position, substantially as specified.

2. A marker for corn-planters, constructed with a standard, a beam fulcrumed in the top of said standard, arms hinged so as to swing upwardly from the ends of said standard, and marking-runners carried by the outer ends of said arms, substantially as specified.

3. An attachment for corn-planters, constructed with a standard carried by the frame of the planter in front of the driver's seat, a beam fulcrumed in the top of said standard, arms hinged to the ends of said beam so that they will fold upwardly, marking-runners carried by the outer ends of said arms, a rock-shaft passing through the standard, a hand-lever fixed to said rock-shaft, and hinged connections from said rock-shaft to the beam to allow said beam to be tilted by the operation of the hand-lever, substantially as specified.

In testimony whereof I affix my signature in presence of two witnesses.

HENRY T. DONALDSON.

Witnesses:
L. V. HILL,
W. W. WILSON.